Jan. 9, 1940.                  W. RIEGER                  2,186,497
                              VALVE CONTROL
                         Filed Jan. 13, 1938          4 Sheets-Sheet 1

Wilhelm Rieger
       Inventor.

Attorneys.

Jan. 9, 1940.  W. RIEGER  2,186,497
VALVE CONTROL
Filed Jan. 13, 1938  4 Sheets-Sheet 4

Inventor:
Wilhelm Rieger
Attorneys:

Patented Jan. 9, 1940

2,186,497

UNITED STATES PATENT OFFICE 2,186,497

VALVE CONTROL

Wilhelm Rieger, Kassel-Wilhelmshohe, Germany

Application January 13, 1938, Serial No. 184,895
In Germany January 26, 1937

9 Claims. (Cl. 121—178)

This invention relates to valve control mechanisms, and particularly relates to a mechanism for changing the setting of the valves to cause a reversal of an engine, such as a steam engine, without using the large and numerous parts heretofore used in valve control mechanisms.

In the prior art, the movement of the link, to which the valve stems are connected, is usually produced by the action of two moving eccentrics which are connected to the link by means of rods, or by means of one eccentric and a second reciprocating member, for example, the crosshead of an engine. In each case the changing of the position of the valve takes place by moving the valve and valve stem by means of a link block which is slidably mounted in the link. Thus, when the engine is to be reversed, the link is moved so that the block shifts from one end of the link to the other end of the link. Because of the fact that the link is being constantly actuated by two rods driven by eccentrics, the link is quite large and the mechanism is constructed of heavy parts. Because of the large masses included in the link and the rods attached thereto, it is difficult to use this construction in a high speed machine, and likewise it is difficult to build a small compact machine.

It is therefore an object of this invention to form a valve control mechanism which is compactly built and especially adapted to be used for high speed engines.

A further object of this invention is to provide a link control for the setting of the valves, which link is operated by but one rod connected to an eccentric shaft.

A further object of the invention is to construct a means for actuating the valves of an engine in which the adjustments for the setting of the valves to operate the engine in reverse direction, and the cut-off position of such valves, are simultaneously made by the same control mechanism.

These objects are in general accomplished by providing a mechanism in which a control shaft operates to adjust the position of the link or the link block upon, and controlled by, a simultaneous adjustment of the position of the link. This results in a mechanism in which the valve may be changed from a position for the forward running of the machine to a position for a reverse running of the machine, while at the same time, maintaining the proper position of the valve for cut-off. To effect this construction, one end of the link may be pivotally connected to a fixed point, and the reciprocating motion imparted to the link by a drive from the drive shaft. The link block is then adjustably mounted within the link and controlled by a means which is regulated by the position of the eccentric shaft with respect to the main drive shaft. Or one end of the link may be driven from the eccentric shaft while the other end of the link is movably adjustable in accordance with the position of the eccentric shaft with respect to the main drive shaft.

The means by which these objects of the invention are obtained are further described by reference to the accompanying drawings, in which.

Figure 1:
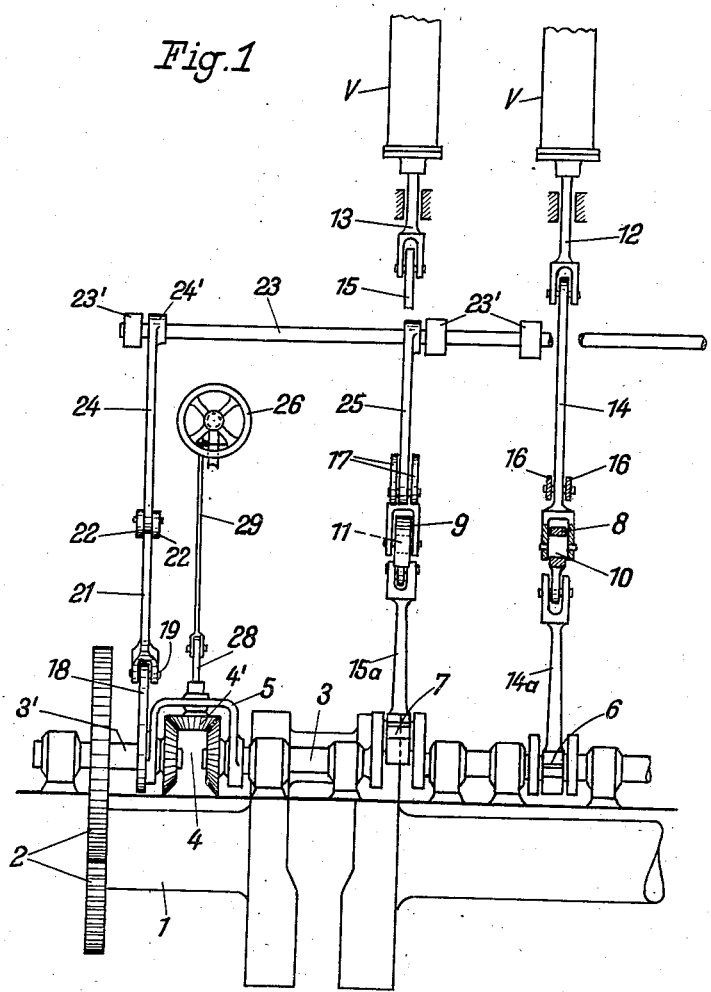
Fig. 1 is a front elevational view of my control mechanism as applied to two valves.
Figure 2:
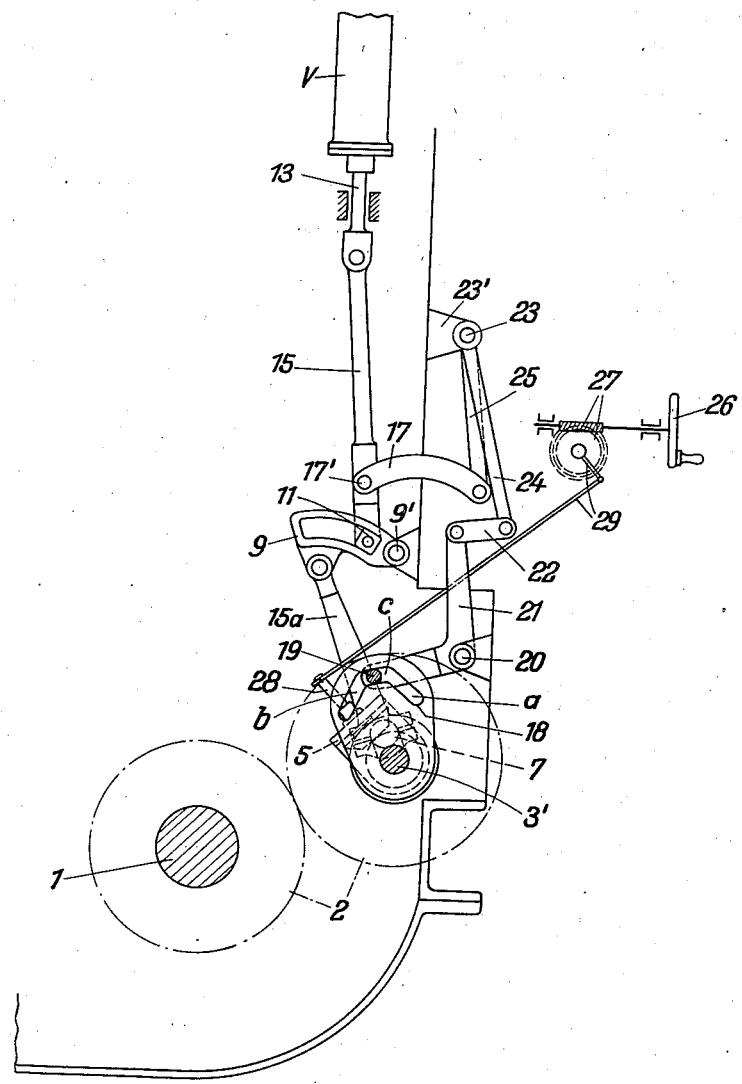
Fig. 2 is an end elevational view of Fig. 1.
Figure 3:
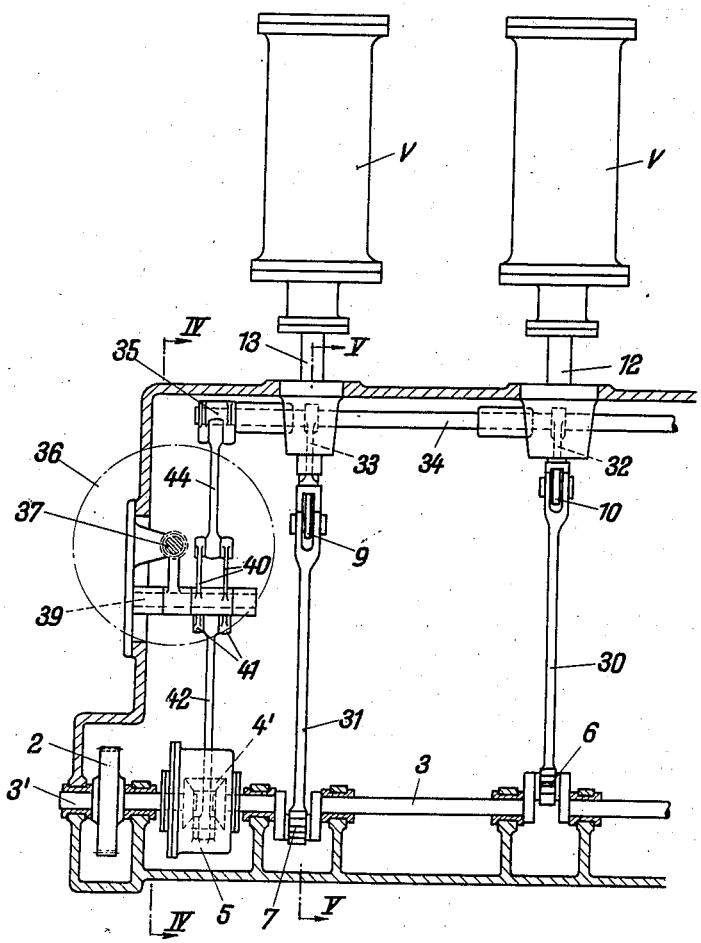
Fig. 3 is a front view of a modified form of the invention.
Figure 4:
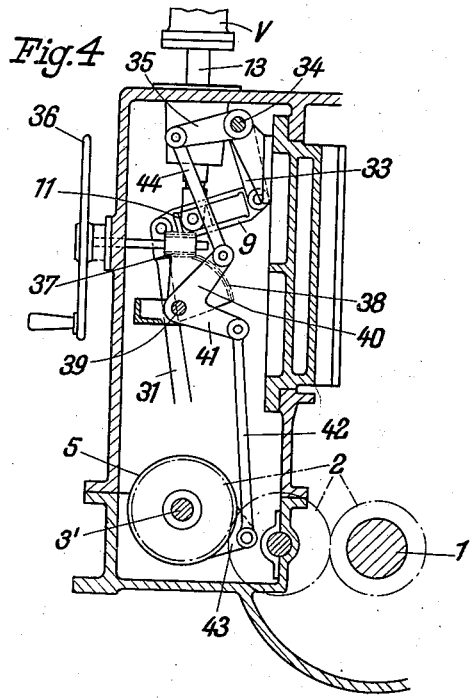
Fig. 4 is a cross-sectional view on the line IV—IV of Fig. 3.
Figure 5:
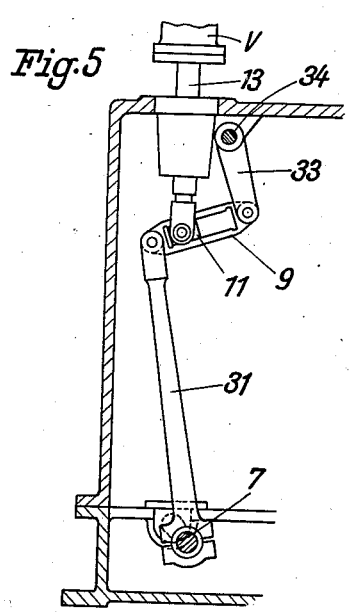
Fig. 5 is a cross-sectional view on the line V—V of Fig. 3.

In Figs. 1 and 2 the main crankshaft of an engine is shown at 1, and mounted adjacent and parallel thereto is an eccentric shaft which, in the structure shown, takes the form of a crankshaft 3. Gears 2 mounted on the end of the shaft 1 and a stub shaft 3' operate a differential gear system 4 which drives the eccentric shaft 3 from main shaft 1. Bevel gear 4' is adjustably mounted in the differential gear system by means of casing 5 which is freely journaled on the ends of the shafts 3 and 3', and movement of this casing will vary the angular position of the eccentric shaft 3 with respect to the main shaft 1.

Valve cylinders are shown at V, said cylinders containing any of the conventional type inlet valves. Joined to these valves are valve stems 12 and 13 which are pivotally connected to connecting rods 14 and 15 respectively. The lower ends of the connecting rods are secured to link blocks 10 and 11 which are mounted in links 8 and 9 respectively. As shown in Fig. 2, one end of the links, as link 9, is pivotally journaled to a fixed pivot 9'. Connecting rods 14a and 15a are each pivotally secured at one end to one of the links and at the other ends are journaled upon the cranks of eccentric shaft 3 at 6 and 7 respectively. It is thus seen that a rotation of the shaft 3 will cause an oscillating movement of the links, which movement is in turn transmitted to the valve stems.

The mechanism for adjusting the position of the link blocks within the links so as to move the position of the valves from forward drive to reverse drive, consists of a series of levers which are adjustably regulated from casing 5. Fixedly secured to the casing 5 is a plate 18 in which there is formed an angular track composed of inclined legs *a* and *b* connected by a leg *c*. The angular position of plate 18, and consequently of the curved track, depends upon the position of the casing 5, which position is determined by the rotation of hand-wheel 26 through worm gearing 27 and lever 28 which is connected to the casing and joined to gearing 27 by arm 29.

A bell-crank 21 pivotally mounted at 20 has one end thereof fixed in the curved track of plate 18 by means of a pin 19 slidable in said track. The other end of the bell-crank is connected to a short arm 22, which, in turn, is connected to a lever 24, said lever 24 having its other end fixed to a shaft 23 at 24'. Shaft 23 is journaled in bearings 23'. Adjacent the links for each valve, rods such as 25 (note Figs. 1 and 2), fixed at one end to the shaft 23, are connected to the valve stems by means of intermediate rods 17 pivoted to the valve stem at 17'. Thus a rotation of the shaft 23 will cause a displacement of the rod 15 and a consequently shifting of the link block 11 in the link 9.

This mechanism operates as follows:

By turning the hand-wheel 26, the casing 5 is rotated, and, likewise, through the intermediate bevel gear 4', the angular position of the eccentric shaft 3 with respect to the main shaft 1, is changed. As the casing 5 is rotated, the plate 18 is likewise rotated and therefore the position of the pin 19 in the curved track is changed, thus changing the angular position of the shaft 23, and consequently the position of the link block 11 in the link 9 (note Fig. 2). Therefore, assuming that the engine has been driving in one direction with the pin 19 at the end of the curved track in leg *a*, as the pin is moved to the position shown in Fig. 2, the valves are moved to neutral position, and as the pin 19 passes to the end of leg *b* the valves are set for the running of the engine in a reverse direction. This is accomplished by the simultaneous adjustment through the planetary gear of the eccentric shaft 3, and therefore the position of the link block in each link is the same for both forward and reverse running of the engine, this being on the extreme left side of the link 9 in Fig. 2 for maximum opening and closing positions of the valves, the degree of valve opening being varied between the right and left hand positions of the block 11 in link 9. Obviously, when the engine is reversed, the displacement of the valve is of equal quantity but of opposite phase.

The shape of the curved track in plate 18 can be made so as to determine the inlet of the valves with great exactness, and with an inlet that always remains the same. The reciprocating movement of the link is accomplished by means of but one connecting rod, rather than the conventional two connection rods heretofore used, and the members need only be of relatively small size in order to accomplish their specific functions. Consequently, not only is the weight of the moving masses reduced, but also a compactness of the machine is produced by the smallness of the members, and therefore an efficient high speed machine can be constructed. It is to be further noted that the links are pivoted to a fixed pivot at one end, and therefore they only need to be half the length of the conventional links, thus resulting in a saving of size and mass.

A structure in which the mechanism is further simplified, yet still obtaining the desired objects, is shown in Figs. 3 to 8, inclusive. In this construction the link is fixed to movable pivots at both ends, one end of the link being given a reciprocal motion by means connected to the eccentric shaft, while the other end of the link is adjustable according to the direction of the rotation of the engine. In this construction, the valve stem does not have any pivotal member connected between it and the link block, but it is directly pivotally connected to the link block and consequently always reciprocates along its axis.

In these figures, reference numerals 1 to 13 indicate the corresponding parts shown in Figs. 1 and 2. The eccentric shaft 3 is driven from the main shaft 1 through intermediate gearing 2. The bevel gear 4' is rotatable with the casing 5 and fixes the position of the eccentric with respect to the main drive shaft. The rotation of casing 5 is effected by means of a hand-wheel 36 which rotates a worm gearing 37 which, in turn, is fastened to, and rotates a shaft 39.

A bell-crank having arms 40 and 41 is fixed and movable by the shaft 39. A rod 42 joins the arm 41 to the casing 5 at 43. Thus the bell-crank, on turning of the hand-wheel, will cause a rotation of the casing 5.

To the other arm 40 of the bell-crank is joined a rod 44 which in turn is connected to a lever 35. Said lever 35 is fastened to shaft 34, which is rotatable from the bell-crank through rod 44 and lever 35.

Therefore, as the hand-wheel 36 is turned, the casing 5 is rotated to displace angularly the eccentric shaft 3, and simultaneously therewith the shaft 34 is rotated.

Extending from shaft 39 adjacent the links 8 and 9, are levers 32, 33 which are fixed at one end to the shaft 34 and are pivotally connected to the links at their other ends. Thereupon movement of the shaft 34 will cause a movement of the links.

Valves contained in the valve cylinders V are given a reciprocal motion through valve stems 12 and 13, links 8 and 9, link blocks 10 and 11, and connecting rods 30 and 31, respectively, these connecting rods being journaled upon the eccentric shaft 3 at 6 and 7.

This mechanism operates in the following manner:

By turning a hand-wheel 36, the casing 5 is rotated, and thus the angular position of the eccentric shaft 3 is changed with respect to the main shaft 1. At the same time, the shaft 34 is rotated and the links 8 and 9 are shifted relative to the link blocks 10 and 11 through levers 33. In this manner, the setting of the valves may be shifted from the operation of the engine in a forward direction to an operation of the engine in a reverse direction, but the inlet of the valves is maintained constant because of the simultaneous displacement of the shaft 34 with the displacement of the eccentric shaft 3.

Figure 6:
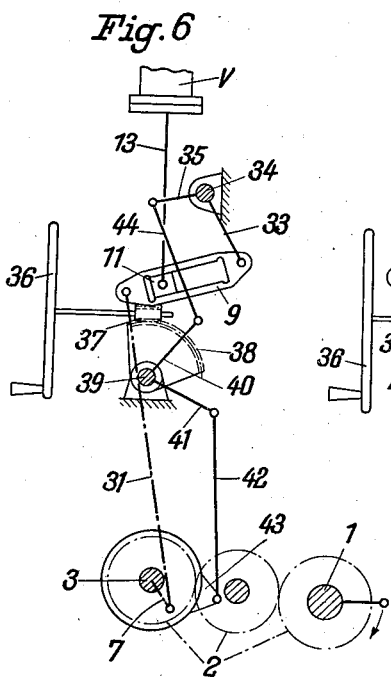
Figs. 6, 7 and 8 are diagrammatic views of the structure as shown in Fig. 4, and show, respectively, the position of the valve control mechanism to operate the engine in one direction, Fig. 6; the mechanism at neutral position, Fig. 7; and the mechanism to operate the engine in reverse direction, Fig. 8.
Figure 7:
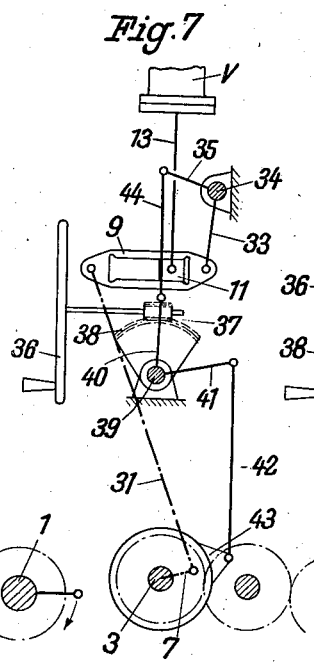
Figure 8:
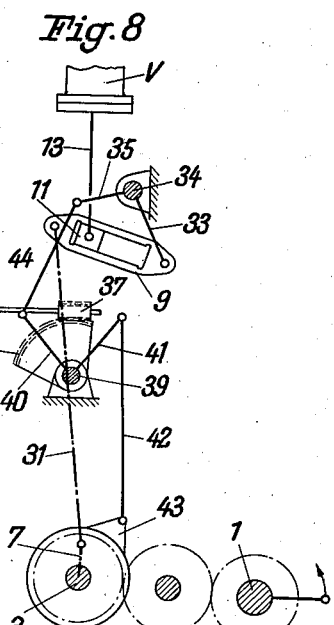

Fig. 6 shows the position of the control mechanism for an assumed forward drive of the engine, the valve stem being in the position so that the steam ports are open. In Fig. 7 the hand-wheel 36 has been rotated so that the valves are brought to neutral position. In Fig. 8 the hand-wheel has been further rotated so that the valves are set for the reverse operation of the machine.

As shown in the various figures, each link is given a reciprocating motion by means of but one connecting rod. Likewise, the mass of the elements may be made comparatively small, and a machine which is both compact and adapted for high speed operation may be favorably constructed.

Having described the means by which the objects of the invention are obtained, what I claim as my invention is:

I claim:

1. A valve operating and reversing mechanism comprising a valve having a valve stem, a link, a link block, eccentric means for giving said link an oscillating movement, means for angularly displacing said eccentric means, and means for simultaneously adjusting the position of said link block with respect to said link upon said angular displacement.

2. A valve mechanism as in claim 1, said eccentric means comprising a crankshaft, and said simultaneous adjusting means comprising a differential gearing connecting said crankshaft to said simultaneously adjusting means.

3. A valve mechanism as in claim 1, said eccentric means comprising a crankshaft and means connecting said crankshaft to one end of said link, and said simultaneous adjusting means comprising means connecting said crankshaft to the other end of said link.

4. A valve control mechanism for a reversible engine comprising a valve having a valve stem, a link, a link block mounted in said link and secured to said valve stem, means to reverse the position of said link for a reverse operation of said engine, and means controlled by said reversing means to adjust simultaneously the position of said block in said link.

5. A valve control mechanism comprising a main crankshaft, an eccentric crankshaft, a valve having a valve stem, a link, means connecting said link to said stem and to said eccentric camshaft, differential gear means connecting said crankshafts, and means for moving said differential gear means for angularly displacing said eccentric crankshaft with respect to said main crankshaft and for simultaneously adjusting the position of said valve stem.

6. A valve control mechanism comprising a valve having a valve stem, a main crankshaft, an eccentric crankshaft, a differential gear connecting said shafts, a rotatable casing for said gear adapted to rotate said eccentric crankshaft, a link connected to said valve stem, means connecting said link to said crankshaft, and means controlled by the rotation of said casing to adjust the position of said valve stem with respect to said link.

7. A control mechanism as in claim 6, said controlled means comprising a plate fastened to said casing and having a curved track therein, a rod member pivotally connected at one end to said valve stem and pivotally connected at the other end to said link, and means guided in said track for varying the position of said pivoted member in said link upon movement of said casing.

8. A control mechanism as in claim 6, said controlled means comprising a trackway movable with said casing, a lever mechanism movable by movement of said trackway, a rod shaft rotatable by said lever mechanism, a link block mounted in said link and pivotally connected to said valve stem, and a second lever mechanism connecting said rod shaft and said link block, said link being secured to a fixed pivot at one end, and being secured to said connecting means at its other end.

9. A control mechanism as in claim 6, said controlled means comprising a bell-crank, means for rotating said bell-crank, means for connecting said bell-crank to said casing, means for connecting the other end of said bell-crank to one end of said link, and said means connecting said link and said eccentric shaft being joined to the other end of said link.

WILHELM RIEGER.